United States Patent
Haddad et al.

(10) Patent No.: US 9,673,922 B2
(45) Date of Patent: Jun. 6, 2017

(54) METHOD AND SYSTEM FOR USER SPEED ESTIMATION IN WIRELESS NETWORKS

(71) Applicants: Alcatel Lucent, Boulogne Billancourt (FR); INRIA, Le Chesnay (FR)

(72) Inventors: Majed Haddad, Le Pontet (FR); Veronique Capdevielle, Nozay (FR); Afef Feki, Nozay (FR); Eitan Altman, Sophia Antipolis (FR)

(73) Assignees: Alcatel Lucent, Boulogne-Billancourt (FR); INRIA, Le-Chesnay (FR)

( * ) Notice: Subject to any disclaimer, the term of this patent is extended or adjusted under 35 U.S.C. 154(b) by 0 days.

(21) Appl. No.: 14/784,685

(22) PCT Filed: Mar. 14, 2014

(86) PCT No.: PCT/EP2014/055058
§ 371 (c)(1),
(2) Date: Oct. 15, 2015

(87) PCT Pub. No.: WO2014/170073
PCT Pub. Date: Oct. 23, 2014

(65) Prior Publication Data
US 2016/0080095 A1 Mar. 17, 2016

(30) Foreign Application Priority Data
Apr. 16, 2013 (EP) .................................. 13305496

(51) Int. Cl.
*H04W 4/02* (2009.01)
*H04B 17/318* (2015.01)
(Continued)

(52) U.S. Cl.
CPC ............ *H04B 17/318* (2015.01); *G01S 11/10* (2013.01); *H04W 4/027* (2013.01); *H04W 24/10* (2013.01); *H04W 64/006* (2013.01)

(58) Field of Classification Search
CPC ...... H04B 17/318; G01S 11/10; H04W 24/10; H04W 4/027; H04W 64/006
See application file for complete search history.

(56) References Cited

U.S. PATENT DOCUMENTS

| 5,396,253 A | 3/1995 | Chia |
| 6,542,745 B1 | 4/2003 | Mottier et al. |

(Continued)

FOREIGN PATENT DOCUMENTS

| JP | H06-501307 A | 2/1994 |
| JP | H07-140232 A | 6/1995 |

(Continued)

OTHER PUBLICATIONS

Kareem E. Baddour et al., Nonparametric Doppler Spread Estimation for Flat Fading Channels, 2003 IEEE Wireless Communications and Networking Conference Record, vol. 2, pp. 953-958, XP010639896, 2003.

(Continued)

*Primary Examiner* — Chuong A Ngo
(74) *Attorney, Agent, or Firm* — Fay Sharpe, LLP

(57) ABSTRACT

A method for estimating the speed of a user equipment connected to a base station of a wireless network, the method comprising the following steps: —performing signal strength measurements (S) of a radio signal transmitted between the user equipment and the base station; —performing a spectral analysis (11) of the signal strength measurements; —determining the frequency of a local maximum in the power spectrum of the signal strength measurements; —estimating (12), from previously established reference data, the speed of the user equipment that corresponds to the determined frequency, the reference data associating a given user equipment speed with a certain determined frequency.

13 Claims, 3 Drawing Sheets

(51) Int. Cl.
*H04W 64/00* (2009.01)
*H04W 24/10* (2009.01)
*G01S 11/10* (2006.01)

(56) References Cited

U.S. PATENT DOCUMENTS

| | | |
|---|---|---|
| 6,577,603 B1 | 6/2003 | Hakalin et al. |
| 7,065,375 B2 | 6/2006 | Bonhomme |
| 7,505,864 B2 | 3/2009 | Sundaralingam et al. |
| 7,647,049 B2 | 1/2010 | Engdahl et al. |
| 7,925,286 B2 | 4/2011 | Demaj |
| 8,948,093 B2 | 2/2015 | Xu et al. |
| 2006/0264231 A1* | 11/2006 | Zhang ............. G01S 11/026 455/523 |
| 2009/0252211 A1 | 10/2009 | Wang |
| 2013/0005280 A1* | 1/2013 | Leung .............. G01S 7/023 455/90.1 |
| 2013/0017828 A1* | 1/2013 | Weng ............ H04W 36/0083 455/434 |
| 2013/0064328 A1* | 3/2013 | Adnani ............ H04B 1/006 375/340 |

FOREIGN PATENT DOCUMENTS

| | | |
|---|---|---|
| JP | 2000-249757 A | 9/2000 |
| JP | 2001-501796 A | 2/2001 |
| JP | 2003-158779 A | 5/2003 |
| JP | 2009-500885 A | 1/2009 |
| JP | 2009-510881 A | 3/2009 |
| JP | 2009-524950 A | 7/2009 |
| JP | 2009-543085 A | 12/2009 |
| JP | 2011-504308 A | 2/2011 |
| JP | 2011-141226 A | 7/2011 |
| WO | WO 2007/133970 A2 | 11/2007 |

OTHER PUBLICATIONS

International Search Report for PCT/EP2014/055058 dated Jul. 9, 2014.

* cited by examiner

METHOD AND SYSTEM FOR USER SPEED ESTIMATION IN WIRELESS NETWORKS

FIELD OF THE INVENTION

The present invention relates to a method and a system for estimating the speed of a user equipment connected to a wireless network.

BACKGROUND OF THE INVENTION

As used herein, the term "user equipment" is meant broadly and not restrictively, to include any user terminal or, more generally, any device able to connect to a wireless network (a mobile telephone, a personal digital assistant, a smartphone, a tablet computer for example).

By "user speed" is meant here the real speed, of a user or, more generally, of an entity provided with a user equipment attached to a serving base station of the wireless network. For example, the speed of a user provided with a mobile phone, or that of a vehicle including a device connected to a wireless network.

The wireless network may be any cellular or wide-area network (such as WiMAX, GSM, 2G/3G, CDMA, LTE or the like) capable of supporting mobility of user equipments connected thereto.

Estimating the user speed is of crucial interest in such wireless networks. Indeed, the user velocity is a key parameter for different wireless network functions including, among others, mobility and radio resource management. Efficiently estimating the user speed has a high impact on wireless network performances and, consequently, the offered quality of service (QoS).

For instance, regarding mobility management, it is straightforward that handover success rate is directly linked to the user speed: the higher the use speed, the higher is handover frequency with greater risk of call dropping (N. Yaakob et al., "*Investigating Mobile Motion Prediction in Supporting Seamless Handover for High Speed Mobile Node*", Proceedings of the International Conference on Computer and Communication Engineering 2008). Accordingly, the optimal adjustment of handover parameters (offsets, hysteresis, timers, and filtering coefficients) should be speed dependent.

The analytical framework proposed by V. Kavitha et al. ("*Spatial Queuing for analysis, design and dimensioning of Picocell networks with mobile users*", Performance evaluation, August 2011) illustrates the dependency of the handover losses and of the cell size on the user speed.

Likewise, as regards radio resource management, the most suitable scheduling scheme, either frequency selective or not, depends on the user velocity. Frequency selective scheduling is generally preferred at low user speeds. Otherwise, due to high Doppler conditions, the frequency dependent channel information is not sufficiently accurate. At high speeds, frequency diverse scheduling is preferable.

Thus, as highlighted above by non-exhaustive examples, accurate information on the user velocity is required for optimizing more than one network mechanism.

Up-to-date solutions for user speed estimation within wireless networks are inefficient and do not meet the accuracy requirements due to various reasons.

For instance, those based on capturing speed-dependent short term variations of received signal strengths measurements are inefficient when the period of measurements is higher than the coherence duration of these fast variations. For example, when the period of measurements is higher than the period of Demodulation Reference Signals in LTE (in particular, higher than 1 ms), the maximum velocity that can be detected is upper bounded. For example, at 5 ms period, the maximum velocity that can be detected is 30 kmph. At 10 ms, performances of speed estimation are satisfactory up to 20 kmph, only.

In fact, with regards to the sampling frequency of measurements, prior methods mainly aim at analyzing speed dependent fast fading characteristics: the Doppler frequency is derived from the covariance or the power spectrum of the fast fading channel. But, the Nyquist theorem imposes a high sampling frequency of measurements to avoid spectrum aliasing thus erroneous Doppler estimation. Consequently, these methods are suitable only with short sampling periods.

Moreover, almost known solutions (notably, crossing based methods (Zhang Hong et al., "*Mobile speed estimation using diversity combining in fading channels*", Center for Communications and Signal Processing Research, New Jersy Institute of Technology, 2004) and covariance based methods (Rosa Zheng Yahong et al. "*Mobile speed estimation for broadband wireless communications over rician fading channels*", IEEE Transactions On Wireless Communications, page 8, January 2009)) are sensitive to noise, especially for small Doppler spreads. As further problems, most of these solutions need the knowledge of the Signal to Noise Ratio (SNR), are limited to Gaussian noise hypothesis, and are complex to implement.

Yet another problem of the prior art is that known solutions need an estimation of the signal power or covariance (as for power spectrum based methods: Baddour Kareem E. et al., "*Nonparametric Doppler spread estimation for flat fading channels*", Department of Electrical and Computer Engineering Queen's University, Kingston, ON, CANADA and University of Alberta, Edmonton, CANADA, 2003) which is difficult because it requires the adequate observation windows.

One object of the present invention is to provide a solution to the aforementioned problems, and offers other advantages over the prior art.

Another object of the present invention is to provide a user speed estimation procedure that efficiently copes with large periods of signal strength measurements.

Another object of the present invention is to propose a real time estimation method of the user speed.

SUMMARY OF THE INVENTION

Various embodiments are directed to addressing the effects of one or more of the problems set forth above. The following presents a simplified summary of embodiments in order to provide a basic understanding of some aspects of the various embodiments. This summary is not an exhaustive overview of these various embodiments. It is not intended to identify key of critical elements or to delineate the scope of these various embodiments. Its sole purpose is to present some concepts in a simplified form as a prelude to the more detailed description that is discussed later.

Various embodiments relate to methods for estimating the speed of a user equipment connected to a base station of a wireless network, these methods comprising the following steps:

performing signal strength measurements of a radio signal transmitted between the user equipment and the base station;

performing a spectral analysis of the signal strength measurements;

determining the frequency of a local maximum in the power spectrum of the signal strength measurements;

estimating, from previously established reference data, the speed of the user equipment that corresponds to the determined frequency, the reference data associating a given user equipment speed with a certain determined frequency.

In accordance with a broad aspect, the local maximum in the power spectrum is the first local peak, in a frequency descending order, (i.e. the last local peak in a frequency ascending order, or equivalently the most right-hand peak) having an amplitude higher than a predefined threshold.

In accordance with another broad aspect, if the estimated speed is below a predefined speed threshold, the above methods further comprise the following steps denoising the signal strength measurements, so that removing noisy frequencies below a predefined frequency threshold;

performing a spectral analysis of the denoised signal strength measurements;

determining the frequency of a local maximum in the power spectrum of the denoised signal strength measurements;

estimating, from previously established reference data, the speed of the user equipment that corresponds to the determined frequency, the reference data associating a given user equipment speed with a certain determined frequency.

In accordance with another broad aspect, the reference data associates a given user equipment speed with a certain determined frequency for a given spatial decorrelation distance of the shadowing, the spatial decorrelation distance being relevant to the radio environment of the base station.

In accordance with another broad aspect, the signal strength measurements are performed by the user equipment on a downlink radio signal then reported to the base station.

In accordance with another broad aspect, the transmitted signal between the user equipment and the base station is a sounding reference signal.

In accordance with another broad aspect, the signal strength measurements are performed by the base station on an uplink signal transmitted from the user equipment.

Further, various embodiments relate to a processing unit for estimating the speed of a user equipment connected to a base station of a wireless network, the processing unit comprising means for performing a spectral analysis of signal strength measurements;

means for determining the frequency of a local maximum in the power spectrum of the signal strength measurements;

means for estimating, from previously established reference data, the speed of the user equipment that corresponds to the determined frequency, the reference data associating a given user equipment speed with a certain determined frequency.

In accordance with a broad aspect, the above processing unit comprises means for denoising the signal strength measurements.

Further, various embodiments relate to a base station comprising the above processing unit.

In accordance with a broad aspect, the above base station is configured to perform signal strength measurements of a radio signal transmitted from a user equipment connected thereto.

Various embodiments further relate to computer program products for performing the above methods.

While the various embodiments are susceptible to various modification and alternative forms, specific embodiments thereof have been shown by way of example in the drawings. It should be understood, however, that the description herein of specific embodiments is not intended to limit the various embodiments to the particular forms disclosed.

It may of course be appreciated that in the development of any such actual embodiments, implementation-specific decisions should be made to achieve the developer's specific goal, such as compliance with system-related and business-related constraints. It will be appreciated that such a development effort might be time consuming but may nevertheless be a routine understanding for those or ordinary skill in the art having the benefit of this disclosure.

DESCRIPTION OF THE DRAWING

The objects, advantages and other features of various embodiments will become more apparent from the following disclosure and claims. The following non-restrictive description of preferred embodiments is given for the purpose of exemplification only with reference to the accompanying drawing in which

DETAILED DESCRIPTION OF ILLUSTRATIVE EMBODIMENTS

Figure 1:
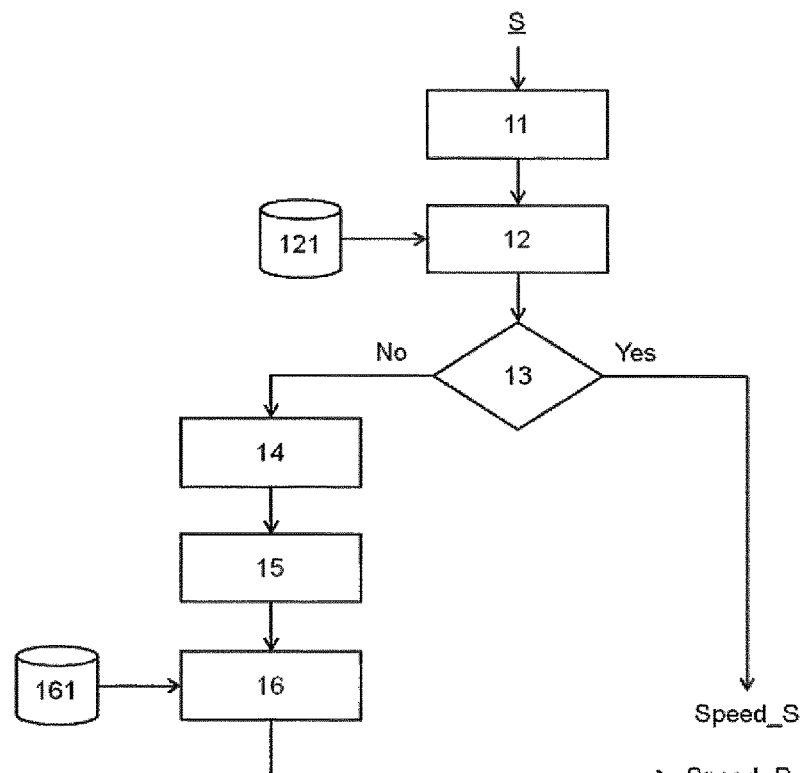
FIG. 1 is a schematic diagram illustrating a flow chart of an embodiment for estimating the user speed.

With reference to FIG. 1, the method for user speed estimation utilizes, as input data, a vector of radio signal power measurements S. These measurements may be performed either by the user equipment then reported to the serving base station or alternatively by the base station itself based on uplink measurements. Accordingly, these measurements may be performed based on downlink or uplink physical signals.

As an illustrative example of such radio signal measurements, one can mention narrow band or wide band power measurements on Sounding Reference Signals (SRS) (such as reference signals for measurement of uplink channel or reference signals for channel quality indicator measurement). These signals are transmitted periodically from the user equipment to the serving base station (generally, with a configurable period typically ranging from 20 ms, 40 ms, 80 ms), independently of data traffic. A vector of power measurements on Sounding Reference Signals is then advantageously available on a regular basis.

The measured signal strengths are subject to speed dependent variations which may be highlighted through a spectral analysis. In fact, compared to an analysis in the time domain, a spectral analysis permits, advantageously, to reveal specific information of measured signal (namely, frequency, phase and amplitude of the component sinusoids). For low speeds, measurements vary "slowly": they may be correlated for a long duration whereas for high speeds, the period during which consecutive measurements do not vary much, is decreased.

In one embodiment, the discrete Fourier Transform (DFT) is used to perform spectral analysis on measurements S (step 11 in FIG. 1). A DFT converts the signal vector S to the frequency domain. As an illustrative example, a FFT (Fast Fourier Transform) algorithm is applied on the signal vector S, returning a discrete Fourier transformation of the signal vector S. The number of FFT points (N_FFT) is the closest power of 2 that is equal to or greater than the length of the vector S. For instance, for a measurement vector S of length equal to 400 samples, the number of FFT points is chosen to be 512. The frequency taps on which is computed the DFT (ZS=fft(S,N_FFT)/length(S)) is a vector of N_FFT/2+1 points from 0 to Fs/2 (in order to satisfy the Nyquist condition), where Fs is the sampling frequency equal to the inverse of the sampling period of measurements S (i.e., 40 ms or 80 ms).

In particular, when the signal is sampled with large sampling periods, large or medium time scale fluctuations can be observed and exploited for discriminating the user speeds.

FIGS. 2.a and 2.b (Fourier amplitude Spectrum of measured signal vector S versus frequency, respectively, for low speed (56 kmph) and high speed (113 kmph)) illustrate the spectral representation of two simulated SRS power measurements vectors S corresponding to a user speed, respectively, of 56 km ph and 113 kmph. In this simulation, a log-normal shadowing model, a sampling period of measurements of 40 ms and a spatial decorrelation distance of shadowing (i.e. the distance beyond which measurement samples are considered uncorrelated) of 40 m are considered.

Figure 2A:
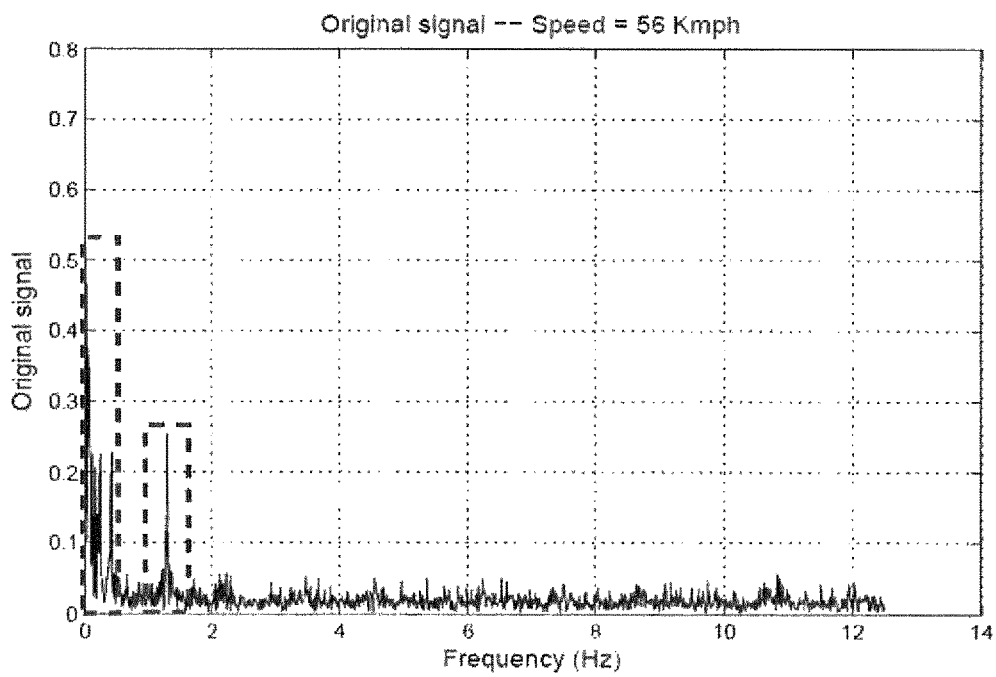
FIGS. 2*a*, 2*b*, 4*a* and 4*b* are curves illustrating spectral analysis of a signal vector for user speed estimation.
Figure 2B:
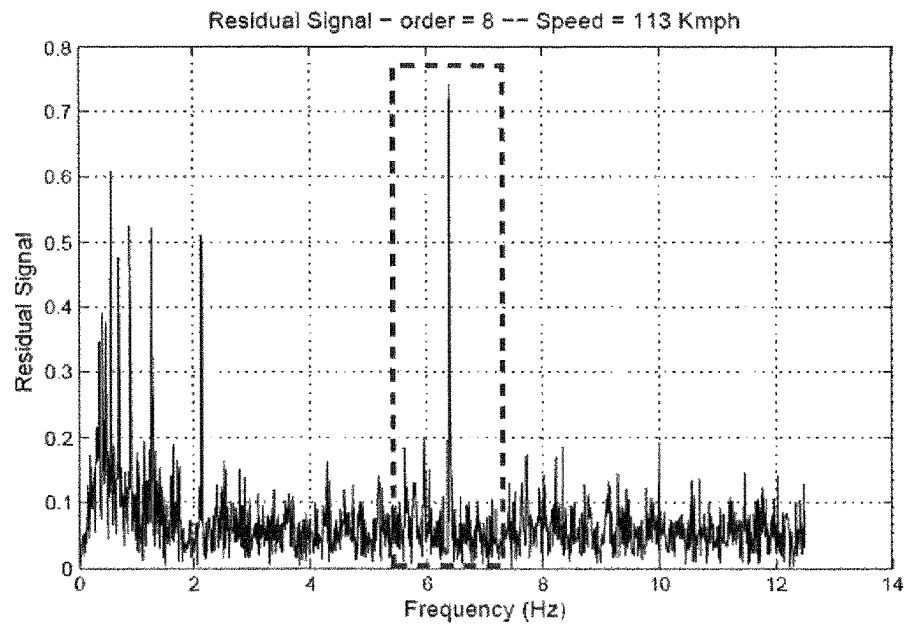

As it can be seen on FIGS. 2a and 2b, the spectral analysis on SRS power measurements reveals harmonic frequencies (boxed peaks in FIGS. 2a and 2b) that are speed dependent. Concretely, the frequency of the main "peak" in the power spectrum increases with speed. Indeed, these fluctuations are more or less rapid depending on the user speed. In the frequency domain, this rapidity of fluctuation is translated by harmonic frequencies: high frequencies for high speeds and low frequencies for low speeds.

The frequency of the most right-hand peak in the power spectrum is the frequency that corresponds to the last local maximum (or equivalently, the first local maximum, in frequency descending order,) peak in the DFT transform of the signal vector S. In one embodiment, a threshold (i.e. a relative/absolute minimum peak amplitude) is set so that this peak is determined only if its amplitude is equal to or higher than the predefined threshold.

Figure 3:
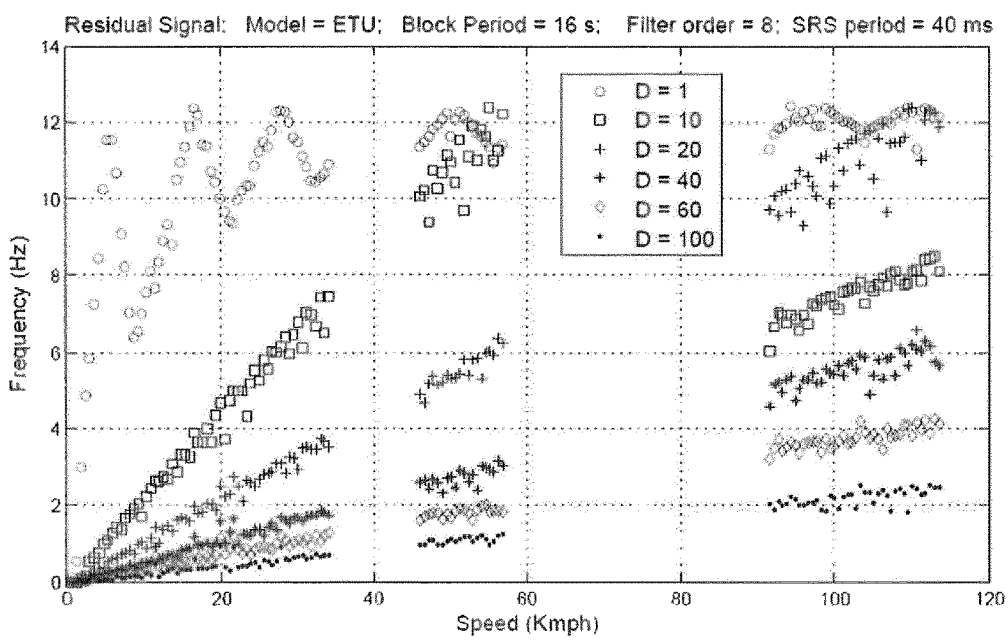
FIG. 3 is a curve illustrating the dependency of the user speed on frequencies deduced from the spectral analysis.

It is to be noted that the peak frequency (frequencies of the boxed peaks in FIGS. 2a and 2b), when observed at large window durations (several seconds) increases with user speed, as shown in FIG. 3 (Oscillation frequency in function of user speed for several decorrelation distances).

Further, the frequency peak depends on the shadowing profile (i.e. the spatial decorrelation distance), as illustrated in FIG. 3 which represents the evolution of the peak frequency (frequencies of the most right-hand boxed peaks in FIGS. 2a and 2b) in function of the user speed for a set of different decorrelation distances (from 1 m to 100 m).

Accordingly, this dependency (correspondence) between the user speed and the peak frequency may constitute a knowledge base which may be utilized for estimating the user speed from the peak frequency. The latter is to be detected from the Discrete Fourier transform of the measured signal vector S. In this regard, a database 121 is configured to comprise predefined reference data, for example in the form of curves, functions or tables, that allow to determine, for a given spatial decorrelation distance of shadowing, the user speed corresponding to a peak frequency determined from the Fourier amplitude Spectrum of a measured signal vector S. The decorrelation distance is preferably selected according (i.e. relevant) to the radio context in which the serving base station (eNB) is deployed (that is to say, the type of the mobile radio environment such as rural, sub-urban, urban, confined).

In one embodiment, the database 121 is set-up off-line. In a variant, the user speed dependency of the peak frequency may be modeled (for example, through fitting curves of kind shown in FIG. 3 for different spatial decorrelation distances. The content of the database 121 is then exploited for speed estimation purpose (step 12 in FIG. 1).

Accordingly, the speed dependency of the frequency (available in database 121) may be utilized to discriminate the user speeds (step 12 in FIG. 1), by mapping the detected peak frequency to reference database 121: peak frequency versus speed for a given decorrelation distance.

Considering the facts, the detected frequency (i.e. the frequency of the peak in the power spectrum) is compared to the content of the database 121 in order to estimate the user speed from the measured vector S (step 12 in FIG. 1). The speed that corresponds to the closest frequency, in the database 121, to the peak frequency—detected from the power spectrum of S—is the estimated speed: Speed_S (Speed estimated from S).

Referring again to FIGS. 2a and 2b, one can note the presence of artefact peaks at low frequencies of the spectrum, whatever the considered speed is (this happening is particularly visible in FIG. 2b). These artefact peaks correspond to "very slow" variation of the received signal strength (i.e. path loss which is quasi constant for the window duration of spectrum computation). These artefact peaks are independent of speed.

These low frequencies artefact peaks may coincide with peaks at low frequencies associated to shadowing in the case of low speeds and then result in erroneous conclusions. Indeed, it is difficult to accurately estimate, in these conditions, low speeds by observing only the spectrum of the original signal vector S.

Figure 4A:
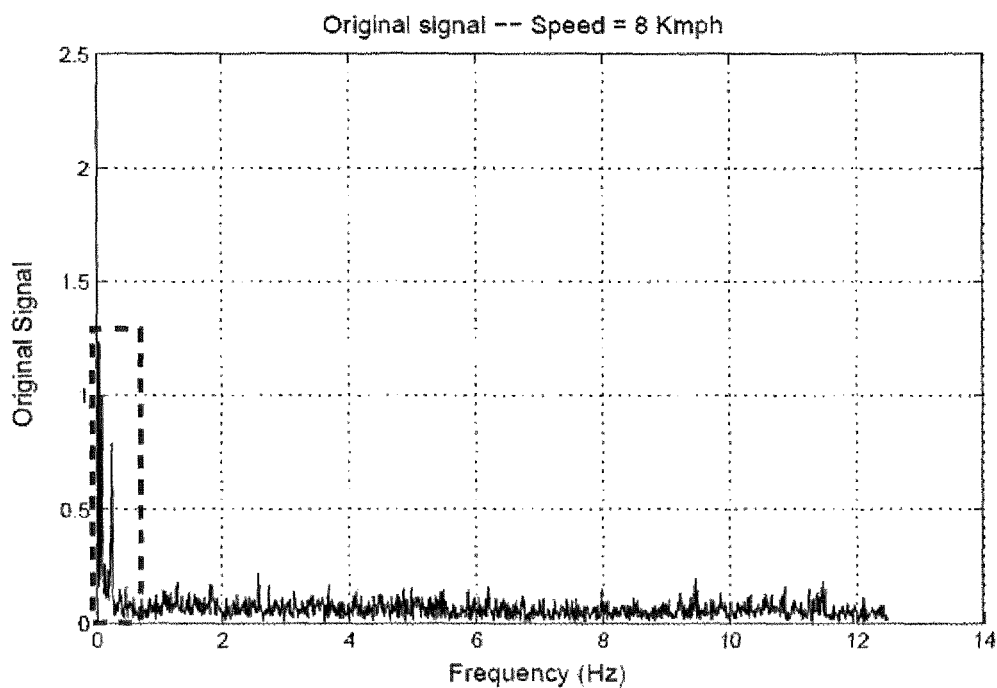

The DFT frequency spectrum of the measured signal strength values S generally comprises a noisy mess for frequencies near from 0 Hz, resulting in inaccurate speed estimation at low speed region (see FIG. 4.a or the first left-hand boxed peak in FIG. 2a). This is due to the fact that, at very low frequencies in the spectrum, the peak is diluted with noisy signals. In order to overcome such inconsistency which concerns low speeds, the estimated speed (Speed_S) from the original signal vector S (i.e. the output of step 12 in FIG. 1) is compared (step 13 in FIG. 1) to a predefined speed value (Speed_X).

In other words, as the artefact peaks may only affect low speed estimation, a speed test is performed on the estimated speed (Speed_S) from the spectral analysis of the measurements vector S. In this test, Speed_S is compared to a predefined speed threshold Speed_X (step 13 in FIG. 1: Speed_S>Speed_x?).

As an illustrative example, the predefined speed value Speed_X may be equal to 20 kmph. This constant may be different from one mobile radio environment to another (i.e. depending on the spatial decorrelation distance of shadowing).

If the estimated user speed Speed_S is greater than the predefined speed value (i.e. if Speed_S>Speed_X), then obtained estimation is considered reliable, and the user speed is equal to Speed_S (user speed=Speed_S: the output of the right-hand branch of the flow chart in FIG. 1). Otherwise, the original signal vector S is passed through a low pass smoothing filter so that removing noisy frequencies below a predefined frequency threshold (step 14 in FIG. 1).

The low pass filtering (smoothing) of the signal vector S aims at extracting parasitic low frequency peaks (i.e. artefact peaks in the power spectrum). Then, the output of the low pass smoothing filter is removed from the original one S, so that obtaining a residual signal R comprising almost shadowing-only variations. Alternatively, the almost shadowing-only variations may be obtained through a high-pass filtering of the original signal vector S.

As illustrated in FIGS. 4.a and 4.b, comparing spectral representations, respectively, of the original signal S and its residual signal R (S being a simulated SRS power measurements corresponding to a user speed of 8.5 km/h), the parasitic low frequencies peaks have disappeared in the spectral representation of R.

Thus, the signal vector S is passed through a low-pass filter. The filtered signal S* (i.e. the resultant signal) is then extracted from the original signal S generating a residual signal R=S−S* (output of the step 14 in FIG. 1).

Figure 4B:
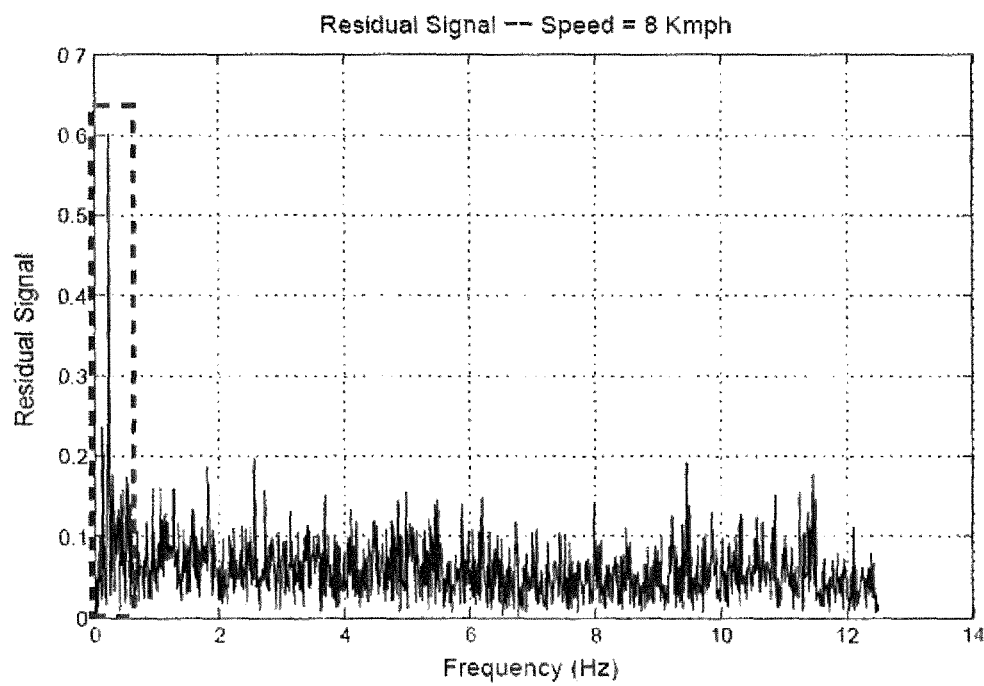

Advantageously, the low-pass smoothing filter smoothes the spectrum of S by removing all noisy frequencies above a certain frequency threshold. It results in that noisy frequencies (near from 0 Hz in FIG. 4a) are reduced (as shown in FIG. 4b). It is worth noting that any other "de-noising" function, permitting to recover a real signal from noisy data set, can be used instead of the low-pass filter (such as that introduced by D. L. Donoho in "De-noising by soft-thresholding", IEEE Trans. Inform. Theory, vol. 41, no. 3, pp. 613-627, May 1995). As an illustrative example, wavelet transformation based method may be adopted for filtering the measured signal vector S.

Likewise, as for the signal vector S,
a spectral analysis is performed on the residual signal R (a Discrete Fourier transform of R: fft(R,Fs)) (step 15 in FIG. 1);
the frequency corresponding to the peak in the power spectrum (i.e. the peak frequency) of the residual signal R is detected (step 15 in FIG. 1);
speed estimation on residual signal R (step 16 in FIG. 1):
the detected peak frequency is compared to the content of the database 161 (similarly defined as the content of the database 121). The speed (Speed_R) that corresponds to the closest frequency from the database 161 to the detected peak frequency is estimated to be the user speed from the residual signal R (i.e. the user speed=Speed_R:the output of the left-hand branch of the flow chart in FIG. 1). It results in that Speed_R represents an accurate estimation of the user speed at low speed region.

Both databases 121 and 161 comprises previously established reference data associating a given user equipment speed with a certain determined frequency. These frequencies may be determined experimentally or theoretically from analytical models for signal strength measurements S of the radio signal with a beforehand known user equipment speed.

In one embodiment, both databases 121 and 161 comprise reference curves (or, functions) that allow to map, for a given decorrelation distance, a peak frequency in a power spectrum of S to its corresponding user speed. These databases 121 and 161 can be
built during a learning phase, by processing radio power measurements for users with known velocities;
built from simulation results; or
selected from pre-processed databases, while taking into account the channel context (i.e. the type of the mobile radio environment).

Advantageously, the above-described methods for user speed estimation within wireless networks, notably LTE networks, efficiently copes with large periods of signal strength measurements, by taking profit of large or medium scale variations of measurements. In fact, when reference signals (such as Sounding Reference Signals) are configured with large periods of transmission because of limited capacity constraints, the above-described method takes profit of large or medium scale variations of measurements.

Further, the disclosed embodiments are, advantageously, efficient to discriminate the user speed based on reported power measurements with high periodicity (more than 20 ms), whereas known methods may be efficient only with measurement with low periodicity (in the order of 1 ms).

Further, the disclosed embodiments are, advantageously, computationally efficient and with low CPU cost (a spectral analysis), which facilitates considerably their integration in real networks and on-line running. Accordingly, the above-described methods may be performed by means of any appropriate processing unit configured to communicate with a base station.

Advantageously, the speed estimation through a spectral analysis of the original signal strength measurements S is computationally highly efficient since it does not require a denoising step prior to spectral analysis. This "standalone" solution can be preferred if coarse precision of speed estimation is sufficient for low speeds. Alternatively, additional computations (namely, for a denoising step) lead to more accurate estimations, whatever is the speed and more particularly for low user speeds.

The invention claimed is:

1. A method for estimating the speed of a user equipment connected to a base station of a wireless network, the method comprising:
performing signal strength measurements of a radio signal transmitted between the user equipment and the base station;
performing a spectral analysis of the signal strength measurements;
determining the frequency of a local maximum in the power spectrum of the signal strength measurements;
estimating, from previously established reference data, the speed of the user equipment that corresponds to the determined frequency, the reference data associating a given user equipment speed with a certain determined frequency.

2. The method of claim 1, wherein the local maximum in the power spectrum is the first local peak, in a frequency descending order, having an amplitude higher than a predefined threshold.

3. The method of claim 1, wherein, if the estimated speed is below a predefined speed threshold, it further comprises:
denoising the signal strength measurements, so that removing noisy frequencies below a predefined frequency threshold;
performing a spectral analysis of the denoised signal strength measurements;
determining the frequency of a local maximum in the power spectrum of the denoised signal strength measurements;
estimating, from previously established reference data, the speed of the user equipment that corresponds to the determined frequency, the reference data associating a given user equipment speed with a certain determined frequency.

4. The method of claim 1, wherein the reference data associates a given user equipment speed with a certain determined frequency for a given spatial decorrelation distance of the shadowing, the spatial decorrelation distance being relevant to the radio environment of the base station.

5. The method of claim 1, wherein the estimated speed is the speed that is associated with the closest frequency, in the previously established reference data, to the determined frequency.

6. The method of claim 1, wherein the signal strength measurements are performed by the user equipment on a downlink radio signal then reported to the base station.

7. The method of claim 1, wherein the transmitted signal between the user equipment and the base station is a sounding reference signal.

8. The method of claim 1, wherein the signal strength measurements are performed by the base station on an uplink signal transmitted from the user equipment.

9. A non-transitory computer readable medium having thereon a computer program including code sections for performing instructions corresponding to the method according to claim 1 when said computer program is implemented on a processing unit of a computer.

10. A processing unit for estimating the speed of a user equipment connected to a base station of a wireless network, the processing unit comprising:
    means for performing a spectral analysis of signal strength measurements;
    means for determining the frequency of a local maximum in the power spectrum of the signal strength measurements;
    means for estimating, from previously established reference data, the speed of the user equipment that corresponds to the determined frequency, the reference data associating a given user equipment speed with a certain determined frequency.

11. The processing unit of claim 10, further comprising means for denoising the signal strength measurements.

12. A base station comprising a processing unit according to claim 10.

13. The base station of claim 12, configured for performing signal strength measurements of a radio signal transmitted from a user equipment connected thereto.

\* \* \* \* \*